United States Patent
Care et al.

(10) Patent No.: US 6,921,559 B2
(45) Date of Patent: *Jul. 26, 2005

(54) POWDER COATING COMPOSITION HAVING A MIXTURE OF FIRST AND SECOND COMPONENT POWDER COATING COMPOSITIONS.

(75) Inventors: Martyn P. Care, Tynemouth (GB); Gareth D. Crapper, North Shields (GB); Kevin J. Kittle, Co. Durham (GB)

(73) Assignee: International Coatings Limited, London (GB)

( * ) Notice: Subject to any disclaimer, the term of this patent is extended or adjusted under 35 U.S.C. 154(b) by 76 days.

This patent is subject to a terminal disclaimer.

(21) Appl. No.: 10/182,913
(22) PCT Filed: Feb. 8, 2001
(86) PCT No.: PCT/GB01/00512

§ 371 (c)(1),
(2), (4) Date: Nov. 25, 2002

(87) PCT Pub. No.: WO01/59018

PCT Pub. Date: Aug. 16, 2001

(65) Prior Publication Data

US 2003/0190435 A1 Oct. 9, 2003

(30) Foreign Application Priority Data

Feb. 8, 2000 (GB) .................................................. 002845

(51) Int. Cl.⁷ ............................. B05D 1/04; C08L 91/06
(52) U.S. Cl. ....................... 427/475; 427/485; 106/218; 428/147
(58) Field of Search ................................. 427/475, 485, 427/470, 486; 106/218; 428/147

(56) References Cited

U.S. PATENT DOCUMENTS

| | | | |
|---|---|---|---|
| 5,002,846 A | | 3/1991 | Creatura et al. |
| 5,735,944 A | * | 4/1998 | Haubennestel et al. ..... 106/272 |
| 5,741,602 A | | 4/1998 | Hoppe et al. |

FOREIGN PATENT DOCUMENTS

| | | | |
|---|---|---|---|
| DE | 36 00 395 A1 | | 8/1987 |
| EP | 0 795 589 A1 | | 9/1997 |
| WO | 00/01775 | * | 1/2000 |

OTHER PUBLICATIONS

Chrisment, A., "Color & Colorimetry"; *The Colorimetric Spaces*; pp. 18–19 (1998).

* cited by examiner

*Primary Examiner*—Frederick J. Parker
(74) *Attorney, Agent, or Firm*—Nixon & Vanderhye (57) ABSTRACT

A powder coating composition comprises a mixture of first and second component powder coating compositions which are separate, preferably widely separated, in a triboelectric reference series indicative of the extent to which powder coating compositions may be distinguishable from one another when electrically charged. The mixed powder coating composition is especially suitable for coating articles having recessed portions. A quantitative basis is given for determining the separation of the individual component compositions in the triboelectric reference series, and preferred minimum separation criteria are given.

13 Claims, 1 Drawing Sheet

POWDER COATING COMPOSITION HAVING A MIXTURE OF FIRST AND SECOND COMPONENT POWDER COATING COMPOSITIONS.

This invention relates to powder coating compositions and to their use in coating substrates, especially substrates of complicated shape, with particular reference to articles having recessed portions.

BACKGROUND OF THE INVENTION

Powder coating compositions generally comprise a solid film-forming resin binder, usually with one or more colouring agents such as pigments, and optionally also contain one or more performance additives. They are to usually thermosetting, incorporating, for example, a film-forming polymer and a corresponding curing agent (which may itself be another film-forming polymer), but thermoplastic systems (based, for example, on polyamides) can in principle be used instead. Powder coating compositions are generally prepared by intimately mixing the ingredients (including colouring agents and performance additives) for example in an extruder, at a temperature above the softening point of the film-forming polymer(s) but below a temperature at which significant pre-reaction would occur. The extrudate is usually rolled into a flat sheet and comminuted, for example by grinding, to the desired particle size. Other homogenisation processes also come into consideration, including non-extruder-based processes such as, for example, processes involving mixing using supercritical fluids, especially carbon dioxide.

Powder coating compositions are generally applied by an electrostatic spray process in which the powder coating particles are electrostatically charged by the spray gun and the substrate (normally metallic) is earthed. The charge on the powder coating particles is normally applied by interaction of the particles with ionised air (corona charging) or by friction (tribostatic or "tribo" charging). The charged particles are transported in air towards the substrate and their final deposition is influenced inter alia by the electric field lines that are generated between the spray gun and the workpiece. A disadvantage of this process is that there are difficulties in coating articles having complicated shapes, and especially articles having recessed portions, as a result of restricted access of the electric field lines into recessed locations (the Faraday cage effect), especially in the case of the relatively strong electric fields generated in the corona-charging process. The Faraday cage effect is much less evident in the case of tribostatic charging processes, but those processes have other drawbacks.

As an alternative to electrostatic spray processes, powder coating compositions may be applied by fluidised-bed processes, in which the substrate workpiece is preheated (typically to 200° C.–400° C.) and dipped into a fluidised bed of the powder coating composition. The powder particles that come into contact with the preheated surface melt and adhere to the workpiece. In the case of thermosetting powder coating compositions, the initially-coated workpiece may be subjected to further heating to complete the curing of the applied coating. Such post-heating may not be necessary in the case of thermoplastic powder coating compositions.

Fluidised-bed processes eliminate the Faraday cage effect, thereby enabling recessed portions in the substrate workpiece to be coated, and are attractive in other respects, but have the well-known disadvantage that the applied coatings are substantially thicker than those obtainable by electrostatic coating processes.

Another alternative application technique for powder coating compositions is the so-called electrostatic fluidised-bed process, in which the fluidising air is ionised by means of charging electrodes arranged in the fluidising chamber or, more usually, in the plenum chamber below the porous air-distribution membrane. The ionised air charges the powder particles, which acquire an overall upwards motion as a result of electrostatic repulsion of identically charged particles. The effect is that a cloud of charged powder particles is formed above the surface of the fluidised bed. The substrate workpiece (earthed) is introduced into the cloud and powder particles are deposited on the substrate surface by electrostatic attraction. No preheating of the substrate workpiece is required.

The electrostatic fluidised-bed process is especially suitable for coating small articles, because the rate of deposition of the powder particles becomes less as the article is moved away from the surface of the charged bed. Also, as in the case of the traditional fluidised-bed process, the powder is confined to an enclosure and there is no need to provide equipment for recycling and reblending the overspray that is not deposited on the substrate. As in the case of the corona-charging electrostatic process, however, there is a strong electric field between the charging electrodes and the substrate workpiece and, as a result, the Faraday cage effect operates to a certain extent and leads to poor deposition of powder particles into recessed locations on the substrate.

WO 99/30838 proposes a process which comprises the steps of establishing a fluidised bed of a powder coating composition, immersing the substrate wholly or partially within the said fluidised bed, applying a voltage to the substrate for at least part of the period of immersion, whereby particles of the powder coating composition are charged substantially by friction alone and adhere to the substrate, withdrawing the substrate from the fluidised bed and forming the adherent particles into a continuous coating over at least part of the substrate.

As compared with processes in which a substantial electric field is generated between charging electrodes and the substrate workpiece, the process of WO 99/30838, which is conducted without ionisation or corona effects in the fluidised bed, offers the possibility of achieving good coating of substrate areas which are rendered inaccessible by the Faraday cage effect.

SUMMARY OF THE INVENTION

The present invention provides a powder coating composition which comprises a mixture of first and second component compositions which are separated (preferably well-separated) in a triboelectric series as herein defined according to the extent of negative or positive charge acquired by the component compositions under standard test conditions.

The use of blended compositions in accordance with the invention offers the possibility of achieving improved Faraday cage penetration in the coating of substrates and, as a result, more uniform coating of substrates having recessed areas or other locations rendered difficultly accessible by the Faraday cage effect, for example, the internal corner regions of microwave ovens. In particular, the invention enables the desired minimum coating thickness to be achieved on such regions without having to apply excess material to other more easily accessible areas of the substrate. Substantial savings of powder coating material are possible.

The invention also provides the use of a powder coating composition of the invention in coating an article having recessed portions which may be, for example, the interior of a refrigerator or microwave oven, an alloy wheel, an architectural extrusion or a radiator fin.

The invention further provides a process for forming a coating on a substrate, in which a composition according to the invention is applied to the substrate by a powder coating process, preferably a corona application process, resulting in particles of the composition adhering to the substrate, and forming the particles into a continuous coating.

The substrate is advantageously an article having recessed portions subject to the Faraday cage effect, and for an article having multiple faces the ratio of the minimum to maximum coating thickness is advantageously at least 40%, preferably at least 50%.

Preferably, the separation between the individual component compositions in the triboelectric series is determined on a quantitative basis and the component compositions are selected so as to satisfy minimum separation criteria as hereinafter explained.

In one approach, mixtures including two powder coating compositions are charged tribostatically, one powder coating composition being found to become positively charged and the other negatively charged, permitting the separation of each charged mixture by directing it at two oppositely charged plates. It is found that some charged mixtures separate to a greater extent than do others when directed at oppositely charged plates.

The fact that one powder coating composition is found to become positively charged and the other negatively charged in a charged mixture of powder coating compositions provides a basis for establishing a triboelectric series of the powder coating compositions. In the resulting triboelectric series, the relative positions of the powder coating compositions are such that each powder coating composition takes on a negative charge in a charged mixture with the powder coating composition positioned immediately above it and a positive charge in a charged mixture with the powder coating composition positioned immediately below it.

The fact that some charged mixtures separate to a greater extent than do others leads to the expectation that two powder coating compositions occupying widely separated positions in the triboelectric series separate from each other to a greater extent than do two powder coating compositions that occupy adjacent positions in the triboelectric series.

A procedure for establishing the triboelectric series for the purposes of the present invention may include the following steps:

(i) selecting a plurality of powder coating compositions for inclusion in the triboelectric series, (ii) selecting a first two of the powder coating compositions, (iii) mixing the two selected powder coating compositions in substantially equal amounts, (iv) causing tribostatic charging of the mixture of powder coating compositions by tribostatic interaction to establish equilibrium tribostatically charged conditions, (v) directing the tribostatically charged mixture at two electrically charged plates of opposite polarities relative to each other, (vi) identifying which of the two powders adheres to the electrically positive plate, (vii) so allocating positions to the two powder coating compositions in the triboelectric series that the powder coating composition which adheres to the positive plate occupies a position immediately below the position of the powder coating composition which adheres to the negative plate, (viii) repeating the steps (ii) to (vii) until all of the powder coating compositions have been tested in pairs and allocated positions in the triboelectric series.

The steps (iv) and (v) above may be combined by ejecting the mixed powder coating compositions from a powder application gun supplied from a fluidised bed hopper.

In a preferred procedure which maintains the separation of the steps (iv) and (v) above, the step (iv) comprises fluidising the mixture and allowing it to develop its equilibrium natural tribostatic charge.

In an alternative procedure which maintains the separation of the steps (iv) and (v) above, the step (iv) comprises placing two powders in a glass jar, shaking the glass jar for a set period, for example about two minutes, then allowing a 30 second relaxation time.

When the above procedure is performed on a plurality of coloured powder coating compositions visual identification of the powder coating compositions is permitted. Black powder coating compositions and white powder coating compositions may, of course, be included.

An adequate number of powder coating compositions for establishing a triboelectric series is seven and more than seven provides a more comprehensive triboelectric series. A minimum number of powder coating compositions for the triboelectric series is of the order of five. Specific materials may be included in the series in order to indicate reference positions although such materials are not necessarily included in powder coating compositions. Suitable reference materials are PTFE (polytetrafluoroethylene) occupying the lowest possible position and polyamide occupying the highest possible position in the triboelectric series.

The triboelectric series should include at least one pair of powder coating compositions which, when subjected to the above mixing, charging and separation procedure, separate between the charged plates to the extent that substantially all of one powder adheres to the positive plate and substantially all of the other powder adheres to the negative plate. Two such powder coating compositions fully satisfy the requirement for powder coating compositions that are well-separated in terms of triboelectric performance. Analagously, there are powder coating compositions which, when subjected to the above mixing, charging and separation procedure, separate little or not at all between the charged plates. The powder coating compositions that make up mixtures which separate little or not at all fail to meet the requirement for powder coating compositions that are well-separated in terms of triboelectric performance.

Where two differently coloured powder coating compositions are subjected to the above mixing, charging and separation procedure and the two powder coating compositions fully satisfy the requirement for powder coating compositions that are well-separated in terms of triboelectric performance, the result is that the colour of the powder coating composition adhering to the positive plate is substantially the same colour as one powder coating composition, the colour of the powder coating composition adhering to the negative plate being substantially the same as the colour of the other powder coating composition. It follows that a subjective quantitative assessment of the triboelectric performance of two differently coloured powders is possible by visual inspection of the colours of the powder coating compositions on the positive and negative plates relative to the respective colours of the powder coating compositions before they are mixed.

An objective quantitative assessment of the triboelectric performance of two differently coloured powders is made with the assistance of a close tolerance reference colour spectrophotometer capable of operating in accordance with the CIE L*a*b*$_{1976}$ system for assessing differences between colour samples. CIE is an abbreviation of Commission International d'Eclairage.

A suitable spectrophotometer is a Spectraflash SF600 PLUS CT manufactured by Datacolor International.

The CIE L*a*b*$_{1976}$ system is a standard for defining colours in terms of a three-dimensional coordinate system and, for rectangular coordinates, a* is the x-coordinate variable, b* is the y-coordinate variable and L* is the z-coordinate variable. The ranges of a* and b* are both −100 to 100 and the range of L is 0 to 100. The following reference coordinates are included in the CIE L*a*b*$_{1976}$ system:
Green: a*=−100, b*=0, L*=50
Red: a*=100, b*=0, L*=50
Blue: a*=0, b*=−100, L*=50
Yellow: a*=0, b*=100, L*=50
White: a*=0, b*=0, L*=100
Black: a*=0, b*=0, L*=0

The colour spectrophotometer operating in accordance with the CIE L*a*b*$_{1976}$ system is capable of expressing the separation between two colour pigments as ΔE, where $\Delta E=(\Delta L^{*2}+\Delta a^{*2}+\Delta b^{*2})^{0.5}$ where ΔL*, Δa* and Δb* are measured in the z, x and y directions, respectively.

Elementary electrostatics permits the separation of oppositely charged particles by directing them towards oppositely charged plates. The negative particles are collected on the positive plate, and vice versa. Provided that there is some discernible difference between the two types of particle then the procedure permits the quantification of the degree of separation between two species in the mixture, by the use of differently coloured particles.

Established procedures for describing the charging behaviour of powder coatings use bulk measurements, which are relatively crude in assessing the charge characteristics of powders. By way of example, consider the following two cases:

| Case A | Case B |
| --- | --- |
| 2 particles of charge +3 | 2 particles of charge +8 |
| 2 particles of charge −2 | 2 particles of charge −7 |
| Total bulk charge = +2 | Total bulk charge = +2 |

A bulk charge measurement according to established procedures would be incapable of distinguishing between these two cases. There is as far as we are aware no commercially available equipment for quantifying the charge distribution in powder coating compositions, so an indirect measurement of the charge behaviour must be made and that is achieved in accordance with the invention by the use of the parameter τ as explained hereinafter. The degree of charge separation in case A is substantially less than that in case B, and it has been found that the application of τ permits the selection of case B rather than case A as the mixture capable of showing the higher separation.

Quantification is most readily achieved in respect of two coloured powder coating compositions between which a significant ΔE exists. A value of ΔE (pure) between the pure powder coating compositions is first determined. The two powder coating compositions are then mixed in equal weight proportions, caused to become tribostatically charged and the charged mixture sprayed through a powder delivery gun at two oppositely charged plates, resulting in a degree of separation of the two powder coating compositions on to the two charged plates according to the relative charges acquired by the two powder coating compositions. The tribostatic charging, preferably, includes fluidising the mixture and allowing it to develop its equilibrium natural tribostatic charge. After suitable treatment, for example stoving, causing the powder coating compositions to become fixed to the two plates, a value ΔE (mixture) is determined between the powder coating compositions on the two plates.

In accordance with the invention a parameter τ has been developed as a practical tool in the assessment of the triboelectric performance of two differently coloured powders using the parameter ΔE. The parameter τ is defined as τ=ΔE(mixture)/ΔE(pure). ΔE(pure) indicates a value for ΔE between two pure powders. The determination of ΔE (mixture) comprises mixing the two powders in about equal weight proportions, causing the charging of the resulting mixture by tribostatic interaction to establish equilibrium tribostatically charged conditions, preferably by fluidising, and causing the mixture to separate by spraying it through a powder delivery gun with no applied voltage at two oppositely charged plates, ΔE(mixture) being the value of ΔE between the "separated" mixture distributed on the oppositely charged plates.

It has been found that the use of colour information permits practical quantification of the extent to which tribostatically charged powder particles separate and that the results of colour measurements are of practical value in the selection of highly-separating powder mixtures.

Preferably, a powder coating composition is characterised by a triboelectric interaction factor τ, between the first and second component powder coating compositions of ≧0.25, ≧0.3, ≧0.4, ≧0.5, ≧0.6, ≧0.7 or ≧0.8, the value of τ being given by the relationship $$\tau=\Delta E(\text{composition mixture})/\Delta E(\text{pure compositions})$$

where $$\Delta E=(\Delta L^{*2}+\Delta a^{*2}+\Delta b^{*2})^{1/2}$$

with L*, a* and b* being respectively the z, y and x-coordinate variables under the CIE L*a*b*$_{1976}$ colour definition system, ΔE (pure compositions) being determined by colour spectrophotometric measurement and ΔE (composition mixture) being determined by mixing the two compositions in equal weight proportions, causing the charging of the resulting mixture by tribostatic interaction to establish equilibrium tribostatically charged conditions, directing the charged mixture onto two oppositely charged plates, resulting in a separation of the compositions on the two plates, and then determining ΔE, by colour spectrophotometric measurement, between the compositions as applied to the two plates, one or both of the respective initial pure compositions being dyed where appropriate to provide an enhanced ΔE between them to facilitate the determination of ΔE (pure compositions) and ΔE (composition mixture).

The ratio τ=ΔE (mixture)/ΔE (pure) is attributed to the mixture of the two powders. If, say, there has been total separation of the powder coating mixture between the two plates, then ΔE(mixture) would be the same as ΔE(pure) and the ratio τ would have a value of 1, possibly giving the same result as a subjective visual examination of the two plates. If, on the other hand, there has been no separation of the powder coating compositions between the two plates, the two plates would be of substantially the same colour and ΔE(mixture) would be substantially zero, leading to a ratio τ=0, which might be determined by visual inspection of the two plates. The ratio τ can, of course, be found to attain any value between 0 and 1, both limits included, according to the value of ΔE(mixture) between the powder coating compositions adhering to the plates in relation to ΔE(pure) between the pure powder coating compositions.

A modified form of the above procedure is applied in the case of two coloured powder coating compositions between which there is not a significant ΔE and, also, in the case of two white powders. The modification involves the addition of a first dyestuff to one powder and, where appropriate to provide an enhanced ΔE, the addition of a second dyestuff to the other powder coating composition, the added dyestuffs being such as not to influence the relative charges acquired by the powder coating compositions. The dyestuffs are so selected as to have a significant ΔE and the remainder of the procedure set out above is followed in order to obtain ΔE for the mixture of the two powder coating compositions. Following the addition of the dyestuffs, each dyed powder coating composition should be checked in relation to the triboelectric series in order to be sure that the addition of the dyestuff does not result in a change in the position of the powder coating composition in the triboelectric series.

The value ΔE used in the calculation of τ is considered to give accurate enough results for practical purposes although the use of $\Delta L^*$, $\Delta a^*$ and $\Delta b^*$ would be expected to provide more accurate determinations of τ.

It has been found that a value for ΔE of 2 is large enough to give satisfactory reproducible results in the determination of τ.

Dyestuffs may also be used for determining the triboelectric performance of two white powder coating compositions following a check, as before, that the addition of the dyestuff does not cause a change in the position of either powder coating composition in the triboelectric series.

The proportion of the dyestuff needed, that is, the proportion needed to achieve ΔE≧2. will in general be ≦0.4% by weight, although usually a lower proportion will suffice, say of the order of 0.1%.

Values of τ greater than 0.25 have been noted to result in enhanced penetration of a mixture of powder coating compositions compared with the penetration of the respective powders into recesses, a value of τ greater than 0.5 is preferred and a value of τ greater than 0.6 is especially preferred. More generally, the value of τ may be ΔE 0.3, ≧0.4, ≧0.5, ≧0.6, ≧0.7 or ≧0.8.

In the case of white powder coating compositions or coloured powder coating compositions showing not much difference in ΔE, the triboelectric performance may be quantified, alternatively or additionally, by incorporating a small amount of two heavy metal compounds into the respective powder coating compositions and measuring the relative amounts of the heavy metal compounds in the powder coating compositions after mixture and separation on to oppositely charged plates. The measurement would be by means of X-ray fluoresence spectroscopy or X-ray mass analysis using a scanning electron microscope.

Advantageously, in the practice of the present invention, first and second component powder coating compositions are selected on the basis of information provided by the triboelectric series to provide powder coating composition mixtures in which the first and second component powder coating compositions are separated in the triboelectric series (in either the positive or negative direction) and, preferably, the first and second powder coating compositions are widely separated in the triboelectric series.

Preferably, the separation between the first and second component powder coating compositions as assessed by the above method using the CIE $L^*a^*b^*_{1976}$ system gives a τ of more than 0.5 and, preferably, more than 0.6.

The position of a given component composition in the triboelectric series may in principle be influenced by a number of variables, including:

(a) the nature and amount of any colouring agent (pigment or dye);

(b) the nature and amount of any filler/extender;

(c) the nature and amount of any post-blended additive;

(d) the nature and amount of any wax incorporated by post-blending as described and claimed in our British Patent Application No 00 02844.9 or our concurrently filed International Patent Application ref IP/A24/5668, or (e) the use of a tribo-enhancing additive known from conventional tribostatic application to enhance the tribostatic performance, such as, for example, an amino alcohol or a tertiary amine or other suitable pre-extrusion additive.

The proportion of first and second component powder coating compositions in a composition according to the invention may be within wide limits, for example, from 5:95 to 95:5 or from 10:90 to 90:10, but will usually be in the range of from 25:75 to 75:25, especially 40:60 to 60:40, and commonly 50:50.

The particle size distribution of each component powder coating composition may be in the range of from 0 to 150 microns, generally up to 120 microns, with a mean particle size in the range of from 15 to 75 microns, preferably at least 20 or 25 microns, advantageously not exceeding 50 microns, more especially 20 to 45 microns. Although the invention can in principle offer advantages over the whole range of particle size distributions, it has been found that the benefits in terms of Faraday cage penetration tend to be less pronounced in relatively fine particle size distributions.

The particle size distribution of each component composition may be the same or different.

Each component powder coating composition according to the invention may contain a single film-forming powder component comprising one or more film-forming resins or may comprise a mixture of two or more such components.

The film-forming resin (polymer) acts as a binder, having the capability of wetting pigments and providing cohesive strength between pigment particles and of wetting or binding to the substrate, and melts and flows in the curing/stoving process after application to the substrate to form a homogeneous film.

The or each powder coating component of a composition of the invention will in general be a thermosetting system, although thermoplastic systems (based, for example, on polyamides) can in principle be used instead.

When a thermosetting resin is used, the solid polymeric binder system generally includes a solid curing agent for the thermosetting resin; alternatively two co-reactive film-forming thermosetting resins may be used.

The film-forming polymer used in the manufacture of the or each component of a thermosetting powder coating composition according to the invention may be one or more selected from carboxy-functional polyester resins, hydroxy-functional polyester resins, epoxy resins, and functional acrylic resins.

A powder coating component of the composition can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehye resin, or a glycol ural formaldehye resin, for example the material "Powderlink 1174" supplied by the Cyanamid Company, or hexahydroxymethyl melamine. A blocked isocyanate curing agent for a hydroxy-functional polyester may, for example, be internally blocked, such as the uretdione type, or may be of the caprolactam-blocked type, for example isophorone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent.

Mixtures of film-forming polymers can be used, for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

A powder coating composition for use according to the invention may be free from added colouring agents, but usually contains one or more such agents (pigments or dyes). Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes can be used instead of or as well as pigments.

The composition of the invention may also include one or more extenders or fillers, which may be used inter alia to assist opacity, whilst minimising costs, or more generally as a diluent.

The following ranges should be mentioned for the total pigment/filler/extender content of a powder coating composition according to the invention (disregarding post-blend additives):

0% to 55% by weight,
0% to 50% by weight,
10% to 50% by weight,
0% to 45% by weight, and
25% to 45% by weight Of the total pigment/filler/extender content, the pigment content will generally be $\leq 40\%$ by weight of the total composition (disregarding post-blend additives) but proportions up to 45% or even 50% by weight may also be used. Usually a pigment content of 25–35% is used, although in the case of dark colours opacity can be obtained with <10% by weight of pigment.

The composition of the invention may also include one or more performance additives, for example, a flow-promoting agent, a plasticiser, a stabiliser against UV degradation, or an anti-gassing agent, such as benzoin, or two or more such additives may be used. The following ranges should be mentioned for the total performance additive content of a powder coating composition according to the invention (disregarding post-blend additives):

0% to 5% by weight,
0% to 3% by weight, and
1% to 2% by weight.

In general, colouring agents, fillers/extenders and performance additives as described above will not be incorporated by post-blending, but will be incorporated before and/or during the extrusion or other homogenisation process.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving); the powder particles melt and flow and a film is formed. The curing times and temperatures are interdependent in accordance with the composition formulation that is used, and the following typical ranges may be mentioned:

| Temperature/° C. | Time |
|---|---|
| 280 to 100* | 10 s to 40 min |
| 250 to 150 | 15 s to 30 min |
| 220 to 160 | 5 min to 20 min |

*Temperatures down to 90° C. may be used for some resins, especially certain epoxy resins.

The invention is applicable over a wide range of applied film thicknesses, typically from thin films of, for example, 30 microns or less up to films of 50, 100, 150 or 200 microns. A typical minimum film thickness is 5 microns.

Mixing of the component compositions may be effected, for example, as follows:

(a) tumbling the compositions together in chip form, followed by co-milling of the mixed chips; or (b) milling each composition separately and then blending the resulting powders in a "tumbler" or other suitable mixing device.

In case (a), for placement of the compositions in a triboelectric series and/or for the determination of τ as hereinbefore defined, a milled powder is prepared from each chip separately, and ΔE is determined for each individual powder and then for a mixture of the two powders in the same proportions as the two different chips are mixed in case (a).

Various additives may be incorporated by post-blending into one or each of the component powder coating compositions. The term "post-blended" means that the or each additive has been incorporated after the extrusion or other homogenisation process. Thus, for example, aluminium oxide or silica may be incorporated by post-blending. Alternatively, post-blended additives may comprise a combination of aluminium oxide and aluminium hydroxide, typically in proportions in the range of from 1:99 to 99:1 by weight, advantageously from 10:90 to 90:10, preferably from 30:70 to 70:30, for example, from 45:55 to 55:45. The combination of aluminium oxide and aluminium hydroxide is disclosed in WO 94/11446 as a fluidity-assisting post-blended additive. Other combinations of the inorganic materials disclosed in WO 94/11446 may in principle also be used in the practice of the present invention.

It is generally recommended that additives as described above are not post-blended into the already-mixed (blended) powder coating composition of the invention.

The advantages of the invention are best seen in corona application processes, but other application processes may in principle be used instead, although the effect of the invention will generally then be less pronounced.

In principle, a powder coating composition of the invention may include more than two component powder coating compositions, provided always that the triboelectric characteristics of any two of the component compositions satisfy the requirements of the invention.

BRIEF DESCRIPTION OF THE DRAWING

The invention will now be further described with reference to the accompanying drawings, in which.

EXAMPLES

The following Examples illustrate the principles and practice of the present invention. The formulations used to make the compositions used in the Examples are set out in the Appendix thereto.

The parameters used for all colour measurements in the Examples were: illuminant D65; Observer 10°, Geometry d/8°. These terms will be understood by all involved in the measurement of colour, for example in the textile and coatings industries.

Example 1

Polyester-TGIC Powder Coating Mixtures

Powder Coating Sample Preparation

The compositions T1 to T6 inclusive of Example 1 were prepared as follows. The base powder coating formulations (presented in Appendix 1) were dry mixed in a blender and fed into a twin-screw extruder operating at 105° C. The extrudate was rolled flat on a chilled plate and broken into chip form.

Milled powders T1 to T6 were prepared from the resulting chip, incorporating in each case by dry blending the dry flow additive (Acematt TS 100-silica) shown on the last line of each formulation presented in Appendix 1. Milling was carried out in an impact mill (Hosokawa ACM5) to produce in each case a powder coating having the following particle size distribution (Malvern Mastersizer X):

| | |
|---|---|
| $d_{(v)99}$ | <100 microns |
| $d_{(v)50}$ | 40 microns |
| 8.0% | <10 microns |

The individual powder coatings were blended in pairs in 1:1 weight ratios to produce 250 grams of mixed powder coating in each case, as summarised in the following table. Each mixture was homogenised by tumble mixing (30 minutes at 1 Hz using a Turbula "T2" mixer with a 1 liter glass mixing vessel). The resulting homogenised mixtures were reserved for future use.

| | T1 | T2 | T3 | T4 | T5 | T6 |
|---|---|---|---|---|---|---|
| T1 | * | a | b | c | d | e |
| T2 | | * | f | g | h | i |
| T3 | | | * | j | k | l |
| T4 | | | | * | m | n |
| T5 | | | | | * | o |
| T6 | | | | | | * |

* 250 grams of each single component powder was retained for comparative purposes.

Determination of the Triboelectric Interaction

The powder coating mixtures (a-o) prepared above were tested as follows:

Each mixture was charged into a fluidised bed (ITW Gema Volstatic, fluidising air pressure 1 bar) and allowed to fluidise for 30 minutes. The powder was then spray applied using an ITW Gema Volstatic corona application gun with the gun voltage at zero (gun settings: fluidising air pressure 1.0 bar, conveying air 0.6 bar, supplementary air 3.5 m³ hour$^{-1}$, single point corona needle at zero volts, baffle nozzle). The sprayed powder cloud was directed towards two panels, one held at −20 kV and another one held at +20 kV. The panel voltage was supplied by means of two Brandenburg Alpha III high voltage power supply units, with the current set to the minimum value that would sustain the voltage. Following application of the powder cloud to the panels for 10 seconds, spraying was stopped, the voltage was removed from the panels, and the coated panels were stoved (10 minutes at 180° C.) in order to fix the applied powder to the panels for subsequent inspection and analysis.

The positive and negative panels for each applied powder mixture were examined to determine (a) if any separation of the components of the mixture had occurred on application, (b) in cases where segregation had occurred, which powder had deposited predominantly on the positive panel, and which powder had deposited predominantly on the negative panel, and (c) the colour difference between the mixture depositing on the positive plate and the mixture depositing on the negative plate.

The colour of each panel in the pairs was evaluated using a Datacolor "Spectraflash SF600 Plus CT" colour computer. This provides colour information for each panel in terms of the CIE L*a*b*$_{1976}$ colourimetric space, in terms of L (white-black), a (green-red) and b (blue-yellow). From these L*, a* and b* values for each panel in the pair, it is possible to calculate the colour difference, ΔE, between the pairs, using the following expression:

$$\Delta E = \sqrt{\Delta L^{*2} + \Delta a^{*2} + \Delta b^{*2}}$$

Where the two pure powder coatings have markedly different colour, the degree of separation on application to two charged plates can be gauged by the colour difference, ΔE, between the mixtures applied to the positive and negative charged panels. The ΔE values were used, together with the ΔE values for the pure colours used in the blend to arrive at the triboelectric interaction, τ, as shown in the following table.

In the case where two pure powder coatings have similar colours, it is not possible to relate colour differences on application of powder coating mixtures to charged plates to any tribostatic interaction. In this case, any preferential deposition of one powder coating onto a given panel will not result in a colour difference. The special case of a series of white powder coatings is dealt with in Example 3 below.

that it always deposits on the negative panel irrespective of what powder coating it is blended with. This indicates that it is at one extreme of the triboelectric series. Similarly, powder T5 always deposits on the positive panel, indicating it is at the opposite end of the series to powder T4.

Similar arguments enable a series to be constructed, as follows:

| Increasing tendency to adhere to negative panel | ↑ |  | T4 T3 T6 |  |
|---|---|---|---|---|
| Increasing tendency to adhere to positive panel |  | NS{ | T2 T1 T5 | }NS |
|  | ↓ |  |  |  |

It can be seen from the table of τ values that certain powder coating mixtures (a and d) exhibit low τ values. To provide a basis for comparison, one of the mixtures (d) was selected for testing, together with one mixture (o) where τ>0.6.

Determination of Penetration of Sprayed Powder Coating Mixtures

Samples of mixture (d) [T1/T5 where no significant segregation was observed above, τ=0.03] and mixture (o) [T5/T6 where significant segregation was observed above, τ=0.69] were spray applied to microwave oven cavities as described hereafter.

Each powder coating mixture was spray applied to a microwave oven cavity (0.5 m wide 0.4 m high 0.4 m deep) using an ITW Gema Volstatic corona application gun (gun settings: fluidising air 1.0 bar, conveying air 0.6 bar, supplementary air 3.5 m$^3$ hour$^{-1}$, single corona needle conical baffle nozzle at −20 kV). The application gun made use of a reciprocator (reciprocator settings: speed 0.35 m s$^{-1}$ in both vertical directions, traverse of 90 cm about the centre of the cavity). The cavities were introduced to the application booth by means of a moving track (track speed: 0.98 m min$^{-1}$). On emerging from the coating booth, the coated cavity was stoved to give cured films (stoving conditions: 10 minutes at 180° C.).

|  | T1 blue | T2 white |  | T3 yellow |  | T4 brown |  | T5 green |  | T6 red |  |
|---|---|---|---|---|---|---|---|---|---|---|---|
| T1 | * | a | NS | b | +T1 | c | +T1 | d | NS | e | +T1 |
|  |  | τ = 0.01 |  | τ = 0.50 | −T3 | τ = 0.80 | −T4 | τ = 0.03 |  | τ = 0.57 | −T6 |
| T2 |  | * |  | f | +T2 | g | +T2 | h | +T5 | l | +T2 |
|  |  |  |  | τ = 0.54 | −T3 | τ = 0.58 | −T4 | τ = 0.23 | −T2 | τ = 0.58 | −T6 |
| T3 |  |  |  | * |  | j | +T3 | k | +T5 | l | +T6 |
|  |  |  |  |  |  | τ = 0.62 | −T4 | τ = 0.65 | −T3 | τ = 0.44 | −T3 |
| T4 |  |  |  |  |  | * |  | m | +T5 | n | +T6 |
|  |  |  |  |  |  |  |  | τ = 0.61 | −T4 | τ = 0.64 | −T4 |
| T5 |  |  |  |  |  |  |  | * |  | o | +T5 |
|  |  |  |  |  |  |  |  |  |  | τ = 0.69 | −T6 |
| T6 |  |  |  |  |  |  |  |  |  | * |  |

Legend
NS No preferential segregation of the two components was observed.
+Tx Powder Tx was seen to preferentially deposit on the panel held at +20 kV.
−Ty Powder Ty was seen to preferentially deposit on the panel held at −20 kV.

By comparison of the data from the table above, it is possible to draw up a list of which powder will preferentially deposit on a given panel on application of any mixture. For example, examination of the results with powder T4 shows Examination of two coated cavities showed that the cavity applied using mixture (d) showed a uniform "salt-and-pepper" effect over all areas of the cavity, with no segregation visible in any area. The cavity applied using mixture (o)

showed a non-uniform "salt-and-pepper" effect, where the T5 (green) powder coating had preferentially deposited on the flat faces of the cavity, and the T6 (red) powder coating had preferentially deposited in the recessed areas of the cavity (specifically, in the corners and where two internal faces join each other).

In the art, a "salt-and-pepper" coating is the description given to the speckled effect produced from lay-down of two dissimilarly-coloured powder coating compositions (typically black and white, although other combinations of colours may be used). The objective is to obtain an even lay-down of the two compositions.

In the context of the present invention, however, a uniform salt-and-pepper effect indicates that there has been little or no triboelectric interaction between the powders and, accordingly, that the powders used will not give enhanced penetration into recessed portions of substrates.

Example 2

Coloured Polyester-Epoxy Powder Coating Mixtures

Powder Coating Sample Preparation

The compositions H1 to H7 inclusive of Example 2 were prepared as follows. The base powder coating formulations (presented in Appendix 1) were dry mixed in a blender and fed into a twin-screw extruder operating at 105° C. The extrudate was rolled flat on a chilled plate and broken into chip form.

Each mixture was homogenised by tumble mixing (30 minutes at 1 Hz using a Turbula "T2" mixer with a 1 liter glass mixing vessel). The resulting homogenised mixtures were reserved for future use.

|    | H1 | H2 | H3 | H4 | H5 | H6 | H7 |
|----|----|----|----|----|----|----|----|
| H1 | *  | a  | b  | c  | d  | e  | f  |
| H2 |    | *  | g  | h  | i  | j  | k  |
| H3 |    |    | *  | l  | m  | n  | o  |
| H4 |    |    |    | *  | p  | q  | r  |
| H5 |    |    |    |    | *  | s  | t  |
| H6 |    |    |    |    |    | *  | u  |
| H7 |    |    |    |    |    |    | *  |

* 250 grams of each single component powder was retained for comparative purposes.

Determination of the Triboelectric Interaction

The powder coating mixtures (a–u) prepared above were tested as described in Example 1. The results of the panel inspections are presented in the following table.

|    | H1 | H2 | | H3 | | H4 | | H5 | | H6 | | H7 | |
|----|----|----|----|----|----|----|----|----|----|----|----|----|----|
| H1 | * | A $\tau = 0.66$ | +H2 −H1 | b $\tau T = 0.63$ | +H1 −H3 | C $\tau = 0.25$ | +H1 −H4 | d $\tau = 0.50$ | +H1 −H5 | e $\tau = 0.18$ | +H6 −H1 | f $\tau = 0.83$ | +H1 −H7 |
| H2 |   | * | | g $\tau = 0.69$ | +H2 −H3 | H $\tau = 0.77$ | +H2 −H4 | i $\tau = 0.81$ | +H2 −H5 | j $\tau = 0.74$ | +H2 −H6 | k $\tau = 0.82$ | +H2 −H7 |
| H3 |   |   | | * | | L $\tau = 0.31$ | +H4 −H3 | m $\tau = 0.06$ | +H5 −H3 | n $\tau = 0.85$ | +H6 −H3 | o $\tau = 0.48$ | +H3 −H7 |
| H4 |   |   | |   | | * | | p $\tau = 0.01$ | +H5 −H4 | q $\tau = 0.80$ | +H6 −H4 | r $\tau = 0.50$ | +H4 −H7 |
| H5 |   |   | |   | |   | | * | | s $\tau = 0.86$ | +H6 −H5 | t $\tau = 0.15$ | +H5 −H7 |
| H6 |   |   | |   | |   | |   | | * | | u $\tau = 0.93$ | +H6 −H7 |
| H7 |   |   | |   | |   | |   | |   | | * | |

Legend
NS No preferential segregation of the two components was observed.
+Hx Powder Hx was seen to preferentially deposit on the panel held at +20 kV.
−Hy Powder Hy was seen to preferentially deposit on the panel held at −20 kV.

Milled powders H1 to H7 were prepared from the resulting chip, incorporating in each case by dry blending the dry flow additive (Acematt TS 100—silica) shown on the last line of each formulation presented in Appendix 1. Milling was carried out in an impact mill (Hosokawa ACM5) to produce in each case a powder coating having the following particle size distribution (Malvern Mastersizer X):

| $d_{(v)99}$ | <100 microns |
| $d_{(v)50}$ | 40 microns |
| 8.0% | <10 microns |

The individual powder coatings were blended in pairs in 1:1 weight ratios to produce 250 grams of mixed powder coating in each case, as summarised in the following table.

Analogously to Example 1, it is possible to analyse the segregation data to construct a tribo series, as follows:

| Increasing tendency to adhere to negative panel | ↑ | H7 |
| | | H3 |
| | | H4 |
| | | H5 |
| Increasing tendency to adhere to positive panel | | H1 |
| | | H6 |
| | ↓ | H2 |

Application to Recessed Panels

Experimental Procedure for Penetration Tests

Figure 1:
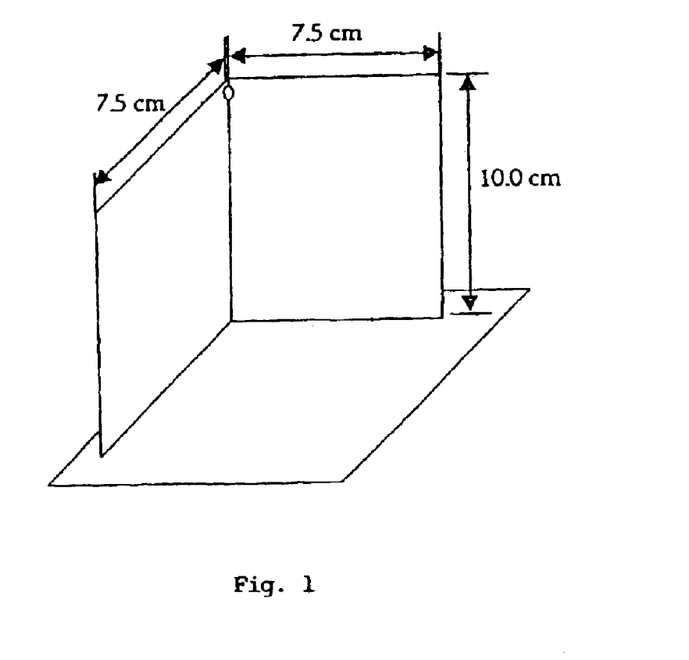
FIG. 1 shows a perspective view of a corner test piece.

Samples of each mixture (a) to (u) were spray applied to mild steel corner test pieces as shown in FIG. 1 which shows a perspective view of the test piece. Each test piece is formed from three planar sections at right angles to each other.

Each powder coating mixture was spray coated using an ITW Gema Volstatic corona application gun, using the procedure outlined below to ensure consistent application for each powder coating.

Figure 2:
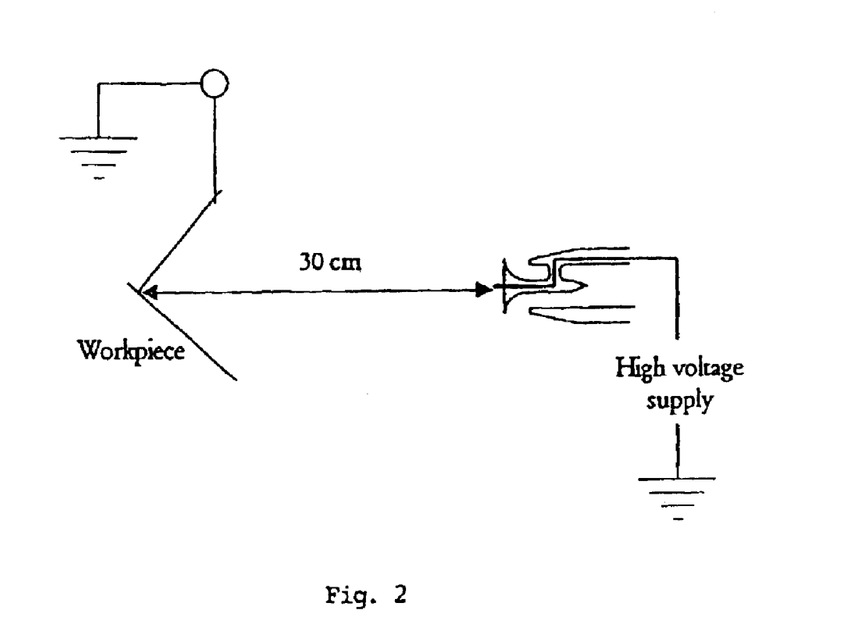
FIG. 2 shows a corner piece which has been allowed to come to rest at its natural center of gravity.

In each test, a corner piece as shown above was suspended in an application booth from the hole shown at the top of the piece. The corner piece was allowed to come to rest at its natural center of gravity, as shown in FIG. 2.

The powder coating application gun was clamped into position such that the gun was pointing directly at the corner of the test piece, with a gun-tip to corner distance of 30 cm. The panel was coated (gun settings: fluidising air 1.0 bar, conveying air 0.6 bar, supplementary air 3.5 $m^3$ $hour^{-3}$, single corona needle conical baffle nozzle at −50 kV). The weight of the coated piece was recorded, and compared with the uncoated weight of the piece. A range of application trials were carried out for each powder coating mixture until an applied weight of 4.0 grams of powder coating had been achieved. The resulting coated test piece was then stoved to give a cured film (stoving conditions: 10 minutes at 180° C.), and reserved for further inspection.

For each coated test piece, the degree of penetration of the powder coating into the corner region was visually assessed. In order to remove the subjective nature of an individual visual assessment of the penetration, six people individually assessed the coated test pieces, and ranked the penetration from best to worst. These results were averaged and collated, into four groups from I—Excellent penetration to IV—Poor penetration.

| Classification | Description |
|---|---|
| I | Excellent penetration |
| II | Good penetration |
| III | Relatively poor penetration |
| IV | Poor penetration |

It was found as a generality that mixtures for which the triboelectric interaction factor τ was <0.25 exhibited poor penetration (class IV) in the tests. Mixtures with τ>0.6 exhibited excellent penetration.

For further comparison purposes, each of the single-component powder coatings H1 to H7 was tested as described above. Based on visual assessments conducted as described, all but one of the powder coatings (H3) gave penetration ranked as class IV (poor). The penetration achieved with H3 was ranked as class III (relatively poor).

EXAMPLE 3

White Polyester-Epoxy Powder Coating Mixtures I

Powder Coating Sample Preparation

The compositions H8 to H12 inclusive of Example 3 were prepared as follows. The base powder coating formulations (presented in the Appendix) were dry mixed in a blender and fed into a twin-screw extruder operating at 105° C. The extrudate was rolled flat on a chilled plate and broken into chip form.

Milled powders H8 to H12 were prepared from the resulting chip, incorporating by dry blending the respective additive shown on the last line of each formulation presented in the Appendix. Milling was carried out in an impact mill (Hosokawa ACM5) to produce in each case a powder coating having the following particle size distribution (Malvern Mastersizer X):

| | |
|---|---|
| $d_{(v)99}$ | <100 microns |
| $d_{(v)50}$ | 40 microns |
| 8.0% | <10 microns |

Determination of the Triboelectric Series

For a series of white powder coatings, it is not possible to visually assess where the powder coating mixtures of these will lie in a triboelectric series, since colour separation across charged plates will not be observable. However, this does not mean there is no preferential deposition when a powder coating mixture of similar colours is spray-applied to two oppositely charged plates.

It is possible to make a qualitative assessment of the separation of two powder coatings of similar colour. This was done by taking the non-white powder coatings used in Example 2, and then determining where the white powder coatings H8 to H12 lie in the triboelectric series established in that each powder coating H8 to H12 with each of H2 to H7 (i.e. missing out the white H1). The resulting powder mixtures were sprayed onto charged panels, as described in Example 1, and the stoved panels inspected. At some point, the white powder coating switches from depositing preferentially on the panel of one polarity and switches to the panel of opposite polarity. At this point, the white powder coating under investigation could be placed into the tribo series determined in Example 2.

The resulting triboelectric series was as follows:

| | Coloured Tribo Series (Example 2) | Position of white powder coatings |
|---|---|---|
| Increasing tendency to adhere to negative panel ↑ | H7 | H8 |
| | H3 | |
| | H4 | |
| | | H9, H10 |
| | H5 | |
| | H1* | H11 |
| Increasing tendency to adhere to positive panel ↓ | H6 | |
| | H2 | H12 |

*H1 is the white powder coating used in Example 2, and thus the position of H11 cannot be distinguished as being above or below that of H1 for reasons discussed above.

Application to Corner Test Pieces

A 1:1 weight ratio mixture of powders H1 and H8 was prepared as described earlier. This powder was applied to a corner test piece as described in Example 2. For purposes of comparison, test pieces were coated in the same way, but using pure powder coating H1 and pure powder coating H8.

The penetration results were ranked according to the scheme outlined in Example 2. The results were as follows:

| Powder Coating | Penetration Result |
| --- | --- |
| H1/H8 mixture | I - Excellent |
| H1 alone | III - Relatively poor |
| H8 alone | IV - Poor |

Thus, according to the invention, by selecting a powder coating mixture where the two components of the mixture are well-separated in the triboelectric series established as described, penetration is markedly improved, and is demonstrably better than that obtained when using either component of the mixture alone.

Example 4

White Polyester-Epoxy Powder Coating Mixtures II

Powder Coating Formulations

The compositions H13 to H20 inclusive of Example 4 were prepared as follows. The base powder coating formulations (presented in the Appendix) were dry mixed in a blender and fed into a twin-screw extruder operating at 105° C. The extrudate was rolled flat on a chilled plate and broken into chip form.

Milled powders H13 to H20 were prepared from the resulting chip, incorporating by dry blending the dry flow additive (Acematt TS100—silica) shown on the last line of each formulation presented in the Appendix. Milling was carried out in an impact mill (Hosokawa ACM5) to produce in each case a powder coating having the following particle size distribution (Malvern Mastersizer X):

| | |
| --- | --- |
| $d_{(v)99}$ | <100 microns |
| $d_{(v)50}$ | 40 microns |
| 8.0% | <10 microns |

The individual powder coatings were blended in pairs in 1:1 weight ratios to produce 250 grams of mixed powder coating, as summarised in the following table. Each mixture was homogenised by tumble mixing (30 minutes at 1 Hz using a Turbula "T2" mixer with a 1 liter glass mixing vessel). The resulting homogenised mixtures, differing in pigment loading as summarised below, were reserved for future use.

| Powder Coating | Mixture | Reference Number | Description |
| --- | --- | --- | --- |
| H13 | H14 | a | 30:70 split on pigmentation |
| H15 | H16 | b | 40:60 split on pigmentation |
| H17 | H18 | c | 45:55 split on pigmentation |
| H19 | H20 | d | 33:67 split on filler |

The mixtures a to d are investigated to determine, using a triboelectric series, the triboelectric interaction between the constituent powders.

EXAMPLE 5

White Polyester-Epoxy Powder Coating Mixtures III

Powder Coating Formulations

The compositions H9, H21 and H22 of Example 5 were prepared as follows. The base powder coating formulations (presented in the Appendix) were dry mixed in a blender and fed into a twin-screw extruder operating at 105° C. The extrudate was rolled flat on a chilled plate and broken into chip form.

Milled powders H9, H21 and H22 were prepared from the resulting chip, incorporating by dry blending the dry flow additive (Acematt TS100—Silica) shown on the last line of each formulation presented in the Appendix. Milling was carried out in an impact mill (Hosokawa ACM5) to produce in each case a powder coating having the following particle size distribution (Malvern Mastersizer X):

| | |
| --- | --- |
| $d_{(v)99}$ | <100 microns |
| $d_{(v)50}$ | 40 microns |
| 8.0% | <10 microns |

Powder coating mixtures were prepared by blending pairs in 1:1 weight ratios to produce 250 grams of mixed powder coating, as summarised in the following table. Each mixture was homogenised by tumble mixing (30 minutes at 1 Hz using a Turbula "T2" mixer with a 1 liter glass mixing vessel). The resulting homogenised mixtures were reserved for future use.

| Powder Coating | Components | Mixture Reference |
| --- | --- | --- |
| H9 | H21 | a |
| H9 | H22 | b |

Example 6

White Polyester-Epoxy Powder Coating Mixtures IV

Powder Coating Formulations

The compositions H9, H21 and H22 of Example 6 were prepared as follows. The base powder coating formulations (presented in the Appendix) were dry mixed in a blender and fed into a twin-screw extruder operating at 105° C. The extrudate was rolled flat on a chilled plate and broken into chip form.

Mixtures of powder coating chip were prepared by blending pairs of chip in 1:1 weight ratios to produce 500 grams of mixed powder coating chips, as summarised in the following table.

| Powder Coating | Components | Mixture Reference |
| --- | --- | --- |
| H9 | H21 | a |
| H9 | H22 | b |

Each mixture was homogenised by tumble mixing (30 minutes at 1 Hz using a Turbula "T2" mixer with a 1 liter glass mixing vessel). The resulting homogenised mixtures of chips were then micronised to produce milled powder coating mixtures incorporating by dry blending the dry flow additive (Acematt TS100 Silica) shown on the last line of each formulation presented in the Appendix. Milling was carried out in an impact mill (Hosokawa ACM5) to produce in each case a powder coating having the following particle size distribution (Malvern Mastersizer X)

| | |
|---|---|
| $d_{(v)99}$ | <100 microns |
| $d_{(v)50}$ | 40 microns |
| 8.0% | <10 microns |

Referring to Examples 5 and 6, formulation H21 incorporates 1% by weight of PTFE-modified polyethylene wax and formulation H22 incorporates 1% by weight of polyamide-modified polyethylene wax, in each case as a pre-extrusion addition. It is found that the incorporation of those waxes provides, after mixing in each case with formulation H9 as described, powder coating compositions exhibiting enhanced penetration into recessed panels. The improvement is considered to be attributable to the triboelectric effect of the different added waxes, which are incorporated over and above the wax or waxes already customarily incorporated for different purposes, for example, to influence flow, hardness or surface appearance.

In Examples 5 and 6 the proportion of the added wax in the final mixed composition is 0.5% by weight, but the proportion derived from pre-extrusion addition may typically be in the range of from 0.05 to 1.0%, advantageously at least 0.075 or 0.1%, and up to 0.75 or 0.5%. The proportions may in principle be varied by altering the amount of wax added to the corresponding base formulation and/or by varying the mixing ratio of the compositions.

Appendix

Product Formulations

| Material | Amount |
|---|---|
| T1 Blue | |
| Carboxy functional polyester, acid value 34 | 543 g |
| Baruim sulphate extender | 167 g |
| Imidazole catalyst | 1 g |
| Triglycidyl isocyanurate | 45 g |
| Benzoin | 3 g |
| Carnauba wax | 3 g |
| Rutile titanium dioxide | 74 g |
| Flow agent | 149 g |
| Indanthrone blue pigment | 3 g |
| Pthalocyanine green pigment | 11 g |
| Acematt TS100 | 1 g |
| T2 White | |
| Carboxy functional polyester, acid value 34 | 452 g |
| Baruim sulphate extender | 120 g |
| Imidazole catalyst | 1 g |
| Matting agent | 3 g |
| Triglycidyl isocyanurate | 41 g |
| Benzoin | 3 g |
| Polyethylene wax | 1 g |
| Rutile titanium dioxide | 240 g |
| Chrome/antimony oxide yellow pigment | 1 g |
| Flow agent | 137 g |
| Acematt TS100 | 1 g |
| T3 Yellow | |
| Carboxy functional polyester, acid value 34 | 625 g |
| Imidazole catalyst | 1 g |
| Matting agent | 2 g |
| Benzoin | 4 g |
| Carnauba wax | 1 g |
| Flow agent | 15 g |
| Triglycidyl isocyanurate | 44 g |
| Rutile titanium dioxide | 94 g |
| Lead chromate yellow pigment | 116 g |
| Aluminium silicate extender | 97 g |
| Acematt TS100 | 1 g |
| T4 Brown | |
| Carboxy functional polyester, acid value 34 | 696 g |
| Iron oxide red pigment | 24 g |
| Baruim sulphate extender | 190 g |
| Imidazole catalyst | 1 g |
| Matting agent | 1 g |
| Triglycidyl isocyanurate | 49 g |
| Benzoin | 3 g |
| Carnauba wax | 1 g |
| Zinc/ferrite brown pigment | 15 g |
| Flow agent | 13 g |
| Carbon black | 6 g |
| Acematt TS100 | 1 g |
| T5 Green | |
| Carboxy functional polyester, acid value 34 | 514 g |
| Baruim sulphate extender | 222 g |
| Imidazole catalyst | 1 g |
| Triglycidyl isocyanurate | 44 g |
| Benzoin | 3 g |
| Carnauba wax | 1 g |
| Rutile titanium dioxide | 22 g |
| Lead chromate yellow pigment | 34 g |
| Flow agent | 136 g |
| Pthalocyanine green pigment | 22 g |
| Acematt TS100 | 1 g |
| T6 Red | |
| Rutile titanium dioxide | 36 g |
| Lead chromate red pigment | 110 g |
| Quinacridone red pigment | 14 g |
| Aluminium silicate extender | 128 g |
| Carboxy functional polyester, acid value 34 | 642 g |
| Triglycidyl isocyanurate | 45 g |
| Carnauba wax | 1 g |
| Benzoin | 3 g |
| Flow agent | 18 g |
| Imidazole catalyst | 1 g |
| Polyethylene wax | 1 g |
| Acematt TS100 | 1 g |
| H1 White | |
| Carboxy functional polyester, acid value 34 | 242 g |
| Ultramarine blue pigment | 1 g |
| Additol catalyst | 2 g |
| Carnauba wax | 3 g |
| Benzoin | 3 g |
| Barytes extender | 107 g |
| Rutile titanium dioxide | 321 g |
| Flow agent | 9 g |
| Epoxy resin, epoxy equivalent weight 510 | 151 g |
| Carboxy functional polyester, acid value 40 | 160 g |
| Acematt TS100 | 1 g |
| H2 Yellow | |
| Carboxy functional polyester, acid value 40 | 461 g |
| Diarylide yellow pigment | 2 g |
| Chrome/antimony oxide yellow pigment | 19 g |
| Quinopthalone yellow pigment | 34 g |
| Additol catalyst | 1 g |
| Aluminium silicate | 9 g |
| Benzoin | 3 g |
| Barytes extender | 84 g |
| Rutile titanium dioxide | 184 g |
| Flow agent | 10 g |
| Epoxy resin, epoxy equivalent weight 770 | 192 g |
| Acematt TS100 | 1 g |
| H3 Red | |
| Carboxy functional polyester, acid value 40 | 259 g |
| Acid amidine curing agent | 12 g |
| Additol catalyst | 1 g |
| Polyethylene wax | 4 g |
| Antioxidant | 2 g |

-continued

Product Formulations

| Material | Amount |
|---|---|
| Iron oxide red pigment | 3 g |
| Rutile titanium dioxide | 22 g |
| Isoidaline yellow pigment | 12 g |
| Napthal mono-azo red pigment | 37 g |
| Barytes extender | 7 g |
| Flow agent | 7 g |
| Epoxy resin, epoxy equivalent weight 700 | 270 g |
| Acematt TS100 | 1 g |
| H4 Blue | |
| Carboxy functional polyester, acid value 35 | 441 g |
| Benzoin | 3 g |
| Polyethylene wax | 3 g |
| Hydrogenated castor oil | 10 g |
| Additol catalyst | 2 g |
| Rutile titanium dioxide | 38 g |
| Pthalyocyanine blue pigment | 37 g |
| Flow agent | 7 g |
| Epoxy resin, epoxy equivalent weight 700 | 178 g |
| Barytes extender | 280 g |
| Acematt TS100 | 1 g |
| H5 Green | |
| Carboxy functional polyester, acid value 40 | 245 g |
| Pthalocyanine green pigment | 20 g |
| Isoindolinone yellow pigment | 19 g |
| Rutile titanium dioxide | 21 g |
| Polyethylene wax | 2 g |
| Antioxidant | 1 g |
| Benzoin | 3 g |
| Additol catalyst | 2 g |
| Barytes extender | 325 g |
| Flow agent | 11 g |
| Epoxy resin, epoxy equivalent weight 700 | 169 g |
| Carboxy functional polyester, acid value 34 | 181 g |
| Acematt TS100 | 1 g |
| H6 Brown | |
| Carboxy functional polyester, acid value 75 | 248 g |
| Carbon black | 9 g |
| Iron oxide red pigment | 10 g |
| Chrome/antimony oxide yellow pigment | 23 g |
| Rutile titanium dioxide | 1 g |
| Polythylene wax | 4 g |
| Benzoin | 3 g |
| Barytes extender | 372 g |
| Flow agent | 7 g |
| Epoxy resin, epoxy equivalent weight 850 | 322 g |
| Acematt TS100 | 1 g |
| H7 Black | |
| Carboxy functional polyester, acid value 34 | 322 g |
| Carbon black | 15 g |
| Additol catalyst | 2 g |
| Polyethylene wax | 4 g |
| Benzoin | 2 g |
| Acid amidine curing agent | 9 g |
| Barytes extender | 377 g |
| Flow agent | 11 g |
| Epoxy resin, epoxy equivalent weight 700 | 257 g |
| Acematt TS100 | 1 g |
| H8 White | |
| Carboxy functional polyester, acid value 40 | 406 g |
| Antioxidant | 2 g |
| Aluminium silicate | 10 g |
| Polyethylene wax | 1 g |
| Benzoin | 3 g |
| Triphenyl phosphine | 1 g |
| Barytes extender | 72 g |
| Rutile titanium dioxide | 323 g |
| Flow agent | 7 g |
| Epoxy resin, epoxy equivalent weight 770 | 173 g |
| Aluminium oxide C | 2 g |
| H9 White | |
| Carboxy functional polyester, acid value 50 | 124 g |
| Additol | 1 g |
| Benzoin | 3 g |
| Amine modified wax | 5 g |
| Polyvinyl resin | 2 g |
| Epoxy resin, epoxy equivalent weight 700 | 121 g |
| Silica wax | 5 g |
| Iron oxide black pigment | 1 g |
| Barytes extender | 59 g |
| Rutile titanium dioxide | 347 g |
| Flow agent | 8 g |
| Epoxy resin, epoxy equivalent weight 770 | 103 g |
| Carboxy functional polyester, acid value 52 | 220 g |
| Aluminium oxide C | 1 g |
| H10 White | |
| Carboxy functional polyester, acid value 52 | 305 g |
| Iron oxide black pigment | 1 g |
| Benzoin | 4 g |
| Hydrogenated castor oil | 20 g |
| Triphenyl phosphine | 1 g |
| Polyethylene wax | 3 g |
| Dolomite extender | 75 g |
| Rutile titanium dioxide | 295 g |
| Flow agent | 10 g |
| Epoxy resin, epoxy equivalent weight 700 | 284 g |
| Silica | 2 g |
| H11 White | |
| Carboxy functional polyester, acid value 80 | 139 g |
| Ultramarine blue pigment | 2 g |
| Benzoin | 2 g |
| Polyethylene wax | 5 g |
| Barytes extender | 154 g |
| Epoxy resin, epoxy equivalent weight 700 | 272 g |
| Rutile titanium dioxide | 279 g |
| Flow agent | 7 g |
| Carboxy functional polyester, acid value 73 | 139 g |
| Acematt TS100 | 1 g |
| H12 White | |
| Carboxy functional polyester, acid value 50 | 303 g |
| Flow agent | 8 g |
| Ultramarine blue pigment | 1 g |
| Benzoin | 6 g |
| Rutile titanium dioxide | 303 g |
| Barytes extender | 76 g |
| Epoxy resin, epoxy equivalent weight 700 | 151 g |
| Epoxy resin, epoxy equivalent weight 770 | 151 g |
| Acematt TS100 | 1 g |
| H13 White | |
| Carboxy functional polyester, acid value 34 | 289 g |
| Ultramarine blue pigment | 1 g |
| Additol catalyst | 2 g |
| Carnauba wax | 3 g |
| Benzoin | 3 g |
| Barytes extender | 128 g |
| Rutile titanium dioxide | 193 g |
| Flow agent | 11 g |
| Epoxy resin, epoxy equivalent weight 510 | 179 g |
| Carboxy functional polyester, acid value 40 | 190 g |
| Acematt TS100 | 1 g |
| H14 White | |
| Carboxy functional polyester, acid value 34 | 195 g |
| Ultramarine blue pigment | 1 g |
| Additol catalyst | 2 g |
| Carnauba wax | 3 g |
| Benzoin | 3 g |
| Barytes extender | 86 g |
| Rutile titanium dioxide | 449 g |
| Flow agent | 7 g |

Product Formulations (continued)

| Material | Amount |
|---|---|
| Epoxy resin, epoxy equivalent weight 510 | 123 g |
| Carboxy functional polyester, acid value 40 | 130 g |
| Acematt TS100 | 1 g |
| H15 White | |
| Carboxy functional polyester, acid value 34 | 265 g |
| Ultramarine blue pigment | 1 g |
| Additol catalyst | 2 g |
| Carnauba wax | 3 g |
| Benzoin | 3 g |
| Barytes extender | 117 g |
| Rutile titanium dioxide | 257 g |
| Flow agent | 10 g |
| Epoxy resin, epoxy equivalent weight 510 | 166 g |
| Carboxy functional polyester, acid value 40 | 175 g |
| Acematt TS100 | 1 g |
| H16 White | |
| Carboxy functional polyester, acid value 34 | 219 g |
| Ultramarine blue pigment | 1 g |
| Additol catalyst | 2 g |
| Carnauba wax | 3 g |
| Benzoin | 3 g |
| Barytes extender | 97 g |
| Rutile titanium dioxide | 385 g |
| Flow agent | 8 g |
| Epoxy resin, epoxy equivalent weight 510 | 136 g |
| Carboxy functional polyester, acid value 40 | 145 g |
| Acematt TS100 | 1 g |
| H17 White | |
| Carboxy functional polyester, acid value 34 | 254 g |
| Ultramarine blue pigment | 1 g |
| Additol catalyst | 2 g |
| Carnauba wax | 3 g |
| Benzoin | 3 g |
| Barytes extender | 112 g |
| Rutile titanium dioxide | 289 g |
| Flow agent | 9 g |
| Epoxy resin, epoxy equivalent weight 510 | 158 g |
| Carboxy functional polyester, acid value 40 | 168 g |
| Acematt TS100 | 1 g |
| H18 White | |
| Carboxy functional polyester, acid value 34 | 230 g |
| Ultramarine blue pigment | 1 g |
| Additol catalyst | 2 g |
| Carnauba wax | 3 g |
| Benzoin | 3 g |
| Barytes extender | 102 g |
| Rutile titanium dioxide | 353 g |
| Flow agent | 9 g |
| Epoxy resin, epoxy equivalent weight 510 | 144 g |
| Carboxy functional polyester, acid value 40 | 152 g |
| Acematt TS100 | 1 g |
| H19 White | |
| Carboxy functional polyester, acid value 34 | 242 g |
| Ultramarine blue pigment | 1 g |
| Additol catalyst | 2 g |
| Carnauba wax | 3 g |
| Benzoin | 3 g |
| Barytes extender | 54 g |
| Rutile titanium dioxide | 321 g |
| Flow agent | 9 g |
| Epoxy resin, epoxy equivalent weight 510 | 151 g |
| Carboxy functional polyester, acid value 40 | 160 g |
| Acematt TS100 | 1 g |
| H20 White | |
| Carboxy functional polyester, acid value 34 | 242 g |
| Ultramarine blue pigment | 1 g |
| Additol catalyst | 2 g |
| Carnauba wax | 3 g |
| Benzoin | 3 g |
| Barytes extender | 160 g |
| Rutile titanium dioxide | 321 g |
| Flow agent | 9 g |
| Epoxy resin, epoxy equivalent weight 510 | 151 g |
| Carboxy functional polyester, acid value 40 | 160 g |
| Acematt TS100 | 1 g |
| H21 | |
| Carboxy functional polyester, acid value 34 | 240 |
| Ultramarine blue pigment | 1 |
| Additol catalyst | 2 |
| Carnauba wax | 3 |
| Benzoin | 3 |
| Barytes extender | 106 |
| Rutile titanium dioxide | 318 |
| Flow agent | 9 |
| Epoxy resin, epoxy equivalent weight 510 | 149 |
| Carboxy functional polyester, acid value 40 | 158 |
| PTFE-modified polyethylene wax | 10 |
| Acematt TS100 | 1 |
| H22 | |
| Carboxy functional polyester, acid value 34 | 240 |
| Ultramarine blue pigment | 1 |
| Additol catalyst | 2 |
| Carnauba wax | 3 |
| Benzoin | 103 |
| Barytes extender | 106 |
| Rutile titanium dioxide | 318 |
| Flow agent | 9 |
| Epoxy resin, epoxy equivalent weight 510 | 149 |
| Carboxy functional polyester, acid value 40 | 158 |
| Polyamide modified polyethylene wax | 10 |
| Acematt TS100 | 1 |

What is claimed is:

1. A powder coating composition which comprises a mixture of first and second component powder coating compositions, there being a triboelectric interaction factor $\tau$ between the component powder coating compositions of $\geq 25$, the value of $\tau$ being given by the relationship $$\tau = \Delta E(\text{composition mixture}) / \Delta E(\text{pure compositions})$$

where $$\Delta E = (\Delta L^{*2} + \Delta a^{*2} + \Delta b^{*2})^{1/2}$$

with $L^*$, $a^*$ and $b^*$ being respectively the z, x and y coordinate variables under the CIE $L^*a^*b^*_{1976}$ color definition system, $\Delta E$ (pure compositions) being determined by color spectrophotometric measurement and $\Delta E$ (composition mixture) being determined by mixing the two component compositions in equal weight proportions, causing charging of the resulting mixture by tribostatic interaction to establish equilibrium tribostatically charged conditions, directing the charged mixture onto two oppositely charged plates, resulting in a separation of the compositions on the two plates, and then determining $\Delta E$, by color spectrophotometric measurement, between the compositions as applied to the two plates, one or both of the respective initial pure component compositions being dyed where appropriate to provide an enhanced $\Delta E$ between them to facilitate the determination of $\Delta E$ (pure compositions) and $\Delta E$ (composition mixture).

2. A powder coating composition as claimed in claim 1, wherein the said triboelectric interaction factor $\tau$ is $\geq 0.3$.

3. A powder coating composition as claimed in claim 1, wherein the said triboelectric interaction factor $\tau$ is $\geq 0.4$.

4. A powder coating composition as claimed in claim 1, wherein the said triboelectric interaction factor $\tau$ is $\geq 0.5$.

5. A powder coating composition as claimed in claim 1, wherein the said triboelectric interaction factor $\tau$ is $\geq 0.6$.

6. A powder coating composition as claimed in claim 1, wherein the said triboelectric interaction factor $\tau$ is $\geq 0.7$.

7. A powder coating composition as claimed in claim 1, wherein the said triboelectric interaction factor $\tau$ is $\geq 0.8$.

8. A process for forming a coating on a substrate, in which a composition as claimed in claim 1 is applied to the substrate by a powder coating process resulting in particles of the composition adhering to the substrate, and forming the adherent particles into a continuous coating.

9. A process as claimed in claim 8, wherein the powder coating process is a corona application process.

10. A process as claimed in claim 8, wherein the substrate is an article having recessed portions subject to the Faraday cage effect.

11. A process as claimed in claim 10, wherein the article has multiple faces and the ratio of the minimum to maximum coating thickness is at least 40%.

12. A process as claimed in claim 11, wherein the said ratio is at least 50%.

13. A coated substrate obtained by a process as claimed in claim 8.

* * * * *